(12) United States Patent
Cinnamon

(10) Patent No.: US 7,832,157 B2
(45) Date of Patent: *Nov. 16, 2010

(54) MOUNTING SYSTEM FOR A SOLAR PANEL

(75) Inventor: Barry Cinnamon, Saratoga, CA (US)

(73) Assignee: Andalay Solar, Inc., Los Gatos, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/616,861

(22) Filed: Dec. 28, 2006

(65) Prior Publication Data
US 2007/0102036 A1 May 10, 2007

Related U.S. Application Data

(63) Continuation of application No. 10/849,069, filed on May 18, 2004, now Pat. No. 7,406,800.

(51) Int. Cl.
E04D 13/18 (2006.01)
(52) U.S. Cl. .................... 52/173.3; 52/586.2; 52/582.1; 136/244; 136/251
(58) Field of Classification Search .................. 52/200, 52/22, 173.3, 251, 586.1, 586.2, 582.1, 656.1, 52/665, 726.2; 136/244, 251; 126/704, 623
See application file for complete search history.

(56) References Cited

U.S. PATENT DOCUMENTS

| 3,630,253 | A | 12/1971 | Sherman |
| 4,154,223 | A | 5/1979 | Lof |
| 4,219,011 | A | 8/1980 | Knoos |
| 4,271,825 | A | 6/1981 | Schwob et al. |
| 4,429,872 | A | * | 2/1984 | Capachi ...................... 473/490 |
| 4,570,408 | A | 2/1986 | Frascaroli et al. |
| 4,691,818 | A | 9/1987 | Weber |
| 4,718,185 | A | 1/1988 | Conlin et al. |
| 4,966,631 | A | 10/1990 | Matlin |

(Continued)

FOREIGN PATENT DOCUMENTS

DE 44 44 439 A1 4/1995

(Continued)

OTHER PUBLICATIONS

PCT/US08/10992 International Search Report, Nov. 25, 2008.

(Continued)

Primary Examiner—Richard E Chilcot, Jr.
Assistant Examiner—William V Gilbert
(74) Attorney, Agent, or Firm—DLA Piper LLP (US)

(57) ABSTRACT

An integrated module frame and racking system for a solar panel is disclosed. The solar panel comprises a plurality of solar modules and a plurality of splices for coupling the plurality of solar modules together. The plurality of splices provide a way to make the connected modules mechanically rigid both during transport to the roof and after mounting for the lifetime of the system, provide wiring connections between modules, provide an electrical grounding path for the modules, provide a way to add modules to the panel, and provide a way to remove or change a defective module. Connector sockets are provided on the sides of the modules to simplify the electrical assembly of modules when the modules are connected together with splices.

14 Claims, 7 Drawing Sheets

U.S. PATENT DOCUMENTS

| | | | |
|---|---|---|---|
| 5,046,791 A | | 9/1991 | Kooiman |
| 5,143,556 A | | 9/1992 | Matlin |
| 5,164,020 A | | 11/1992 | Wagner et al. |
| 5,203,135 A | | 4/1993 | Bastian |
| 5,205,694 A | | 4/1993 | Nagoshi et al. |
| 5,497,587 A | * | 3/1996 | Hirai et al. ............... 52/173.3 |
| 5,571,338 A | * | 11/1996 | Kadonome et al. .......... 136/251 |
| 5,596,981 A | | 1/1997 | Soucy |
| 5,628,580 A | | 5/1997 | Rinderer |
| 5,706,617 A | * | 1/1998 | Hirai et al. ............... 52/173.3 |
| 5,746,029 A | | 5/1998 | Ullman |
| 6,093,884 A | | 7/2000 | Toyomura et al. |
| 6,105,317 A | | 8/2000 | Tomiuchi et al. |
| 6,111,189 A | | 8/2000 | Garvison et al. |
| 6,201,180 B1 | | 3/2001 | Meyer et al. |
| 6,207,889 B1 | | 3/2001 | Toyomura et al. |
| 6,269,596 B1 | | 8/2001 | Ohtsuka et al. |
| 6,360,491 B1 | | 3/2002 | Ullman |
| 6,370,828 B1 | | 4/2002 | Genschorek |
| 6,465,724 B1 | | 10/2002 | Garvison et al. |
| 6,501,013 B1 | | 12/2002 | Dinwoodie |
| 6,670,541 B2 | | 12/2003 | Nagao et al. |
| 6,672,018 B2 | | 1/2004 | Shingleton |
| 6,675,545 B2 | | 1/2004 | Chen et al. |
| 6,761,008 B2 | | 7/2004 | Chen et al. |
| 6,784,360 B2 | * | 8/2004 | Nakajima et al. ........... 136/251 |
| 6,959,517 B2 | * | 11/2005 | Poddany et al. ............ 52/173.3 |
| 7,043,884 B2 | * | 5/2006 | Moreno ...................... 52/235 |
| 7,406,800 B2 | | 8/2008 | Cinnamon et al. |
| 7,592,537 B1 | | 9/2009 | West |
| 2002/0046506 A1 | | 4/2002 | Ullman |
| 2002/0078991 A1 | | 6/2002 | Nagao et al. |
| 2003/0015637 A1 | * | 1/2003 | Liebendorfer ............... 248/237 |
| 2003/0070368 A1 | * | 4/2003 | Shingleton ................ 52/173.3 |
| 2003/0175071 A1 | | 9/2003 | Layfield |
| 2004/0063265 A1 | | 4/2004 | Noble |
| 2004/0163338 A1 | * | 8/2004 | Liebendorfer .............. 52/173.1 |
| 2006/0118163 A1 | | 6/2006 | Plaisted et al. |
| 2007/0079865 A1 | | 4/2007 | Warfield et al. |

FOREIGN PATENT DOCUMENTS

| | | |
|---|---|---|
| DE | 29703481 U | 11/1997 |
| JP | 47-023570 | 7/1971 |
| JP | 47-057885 | 5/1972 |
| JP | 57-077856 | 5/1982 |
| JP | 61-040963 | 11/1986 |
| JP | 04-052367 | 2/1992 |
| JP | 06-069527 | 3/1994 |
| JP | 07-202242 | 8/1995 |
| JP | 11-040835 | 2/1999 |
| JP | 2001-210853 | 8/2001 |
| JP | 2002-141541 | 5/2002 |

OTHER PUBLICATIONS

PCT/US08/10992 Written Opinion, Nov. 25, 2008.
PCT/US05/16849 International Search Report, Jun. 19, 2008.
PCT/US05/16849 Written Opinion, Jun. 19, 2008.
Interpartes re-examination order for US Patent No. 7,406,800 dated Apr. 16, 2010 (Control No. 95/001,304).
Interpartes re-examination office action for US Patent No. 7,406,800 dated Apr. 16, 2010 (Control No. 95/001,304).
Response to Interpartes re-examination office action Pursuant to 37 CFR 1.945 dated May 14, 2010 (Control No. 95/001,304( (13 pgs.).
"Re-Exam 95/001,304 (U.S. Appl. No. 10/849,069), Response to Inter-Parties Re-Exam Office Action Pursuant to 37 CFR 1.945", filed on Sep. 23, 2010 (20 pgs.).
"Re-Exam 95/001,304 (U.S. Appl. No. 10/849,069), Non-Final Office action dated Sep. 1, 2010", mailed Sep. 1, 2010 (22 pgs.).
"Re-Exam 95/001,304 (U.S. Appl. No. 10/849,069), Response to Inter-Parties Re-Exam Office Action Pursuant to 37 CFR 1.945", filed on May 14, 2010 (10 pgs.).
"Re-Exam 95/001,304 (U.S. Appl. No. 10/849,069), Non-Final Office action dated Sep. 1, 2010", mailed on Apr. 16, 2010 (40 pgs.).

* cited by examiner

MOUNTING SYSTEM FOR A SOLAR PANEL

CROSS-REFERENCE TO RELATED APPLICATIONS

Under 35 U.S.C. §120, this application is a continuation application claiming the benefit of priority to U.S. patent application Ser. No. 10/849,069, entitled "Mounting System For A Solar Panel", filed May 18, 2004, all of which is incorporated herein by reference.

BACKGROUND OF THE INVENTION

1. Field of the Invention

The present invention relates generally to solar panels and more particularly to an assembly and mounting system for a solar panel.

2. Description of Related Art

Solar electric systems are the most environmentally friendly way of generating electricity. To provide such solar electric systems, typically there is a solar panel, which comprises a plurality of solar modules, which are coupled together. The solar panels are typically assembled directly on the roof of a building, assembled on the ground and then mounted on a roof of a building, or installed on a dedicated ground or pole mounted frame. FIG. 1 illustrates a conventional solar panel assembly 10. The solar panel in this embodiment comprises three solar modules, 12A-12C. However, one of ordinary skill in the art recognizes there could be any number of modules and they could be in any configuration to form a solar panel.

Each of the solar panel modules 12A-12C includes a junction box 14A-14C which receives cables 16, which are applied in serial fashion from one module to the next. Also included within each of these modules 12A-12C is an electrical ground wire assembly 18, which is used to ground the modules and the underlying frame at the appropriate points. In addition, each of the modules includes extra wiring from nearby modules that must be wrapped and tied down in between, as shown at 20A and 20B to ensure that the wires do not get damaged. FIG. 1A is a view of the grounding screw for the solar panel. The screw or bolt assembly 22, which must be provided in several places, attaches the ground wire assembly 18 to each piece of equipment in the assembly at least once, in this case five (5) places, on each of the solar modules 12A-12C and underlying frame, thereby creating a grounded assembly.

Referring back in FIG. 1 there are two metal rails 24 that extend in parallel with and along the length of the solar modules 12A-12C. These rails form the underlying support structure for the solar modules. The rails are attached to the roof so that the entire solar panel can be mounted in a single rigid geometric plane on the roof, thereby improving the durability and aesthetics of the installation. In some cases the rails are mounted to the roof first (attached to the roof with L shaped brackets and lag bolts to the underlying rafters), and then the modules are attached to the rails with bolt-fastened clips. In other cases, as shown in FIG. 1B, the rails are attached to the modules first (in this case with hex nuts and bolts or in other cases clips), and then the entire module-rail assembly (or panel) is attached to the roof with L shaped brackets 26 (FIG. 1) and lag bolts to the underlying rafters. These rails 24 are also electrically grounded as indicated above.

For ventilation and drainage purposes it is beneficial to mount the panel above the roof with a small air gap between the roof surface and underside of the modules and rails. For wiring and grounding purposes for roof-assembled panels it is beneficial to have access below the modules so that wires can be connected and tied. For single geometric plan purposes it is beneficial to provide some vertical adjustability of the mounting point to account for variability (waviness) in roof surfaces. For these reasons the roof mounting bracket (whether it is an L shaped bracket or different design) generally provides some vertical adjustability (typically 1-3 inches). Moreover, roof attachments must be made to a secure underlying surface, generally a rafter. These rafters may not be consistently spaced. Therefore, the mounting rails typically include some kind of adjustable groove so that the mounting point from the rail to the roof attachment (L bracket) can be directly over a secure mounting point—wherever this point may be.

The conventional solar panel 10 requires many individual operations to construct and mount in order to provide a reliable and high performance solar electric system. Mounting on uneven roof surfaces requires many small parts and adjustments. Making sure there is airflow and drainage requires the panel to be raised off the roof slightly, but aesthetic considerations require the panel to be close to the roof. Each module in the panel must be wired together, extra wiring must be tucked away securely, and every conductive component must be electrically grounded. All the required parts and steps increase the cost of the system, which ultimately negatively affects the payback of the system. In addition, conventional solar modules are shipped in cardboard boxes on palettes, requiring additional shipping costs and substantial unpacking and cardboard disposal costs.

Accordingly, what is desired is a solar module which is more self contained, including all the mounting and wiring hardware, without requiring all of the individual operations, minimizing the number of electrical grounding steps required, and minimizing the amount of wiring and cables that need to be managed. Finally, the system should be one that minimizes the number of parts and tools that an installer would need to assemble and install the panel. This system should be easily implemented, adaptable to various environments and cost-effective. The present invention addresses such a need.

SUMMARY OF THE INVENTION

An integrated module frame and racking system for a solar panel is disclosed. The solar panel comprises a plurality of solar modules and a plurality of splices for coupling the plurality of solar modules together. The plurality of splices provide a way to make the connected modules mechanically rigid both during transport to the roof and after mounting for the lifetime of the system, provide wiring connections between modules, provide an electrical grounding path for the modules, provide a way to add modules to the panel, and provide a way to remove or change a defective module. Connector sockets are provided on the sides of the modules to simplify the electrical assembly of modules when the modules are connected together with splices.

A solar panel in accordance with the present invention is optimized for fast and reliable installation. In addition, the fewer parts and simpler assembly technique reduces the potential for installation error. In addition, multiple modules for the panel can be supported during transport. In addition, modules and panels can be assembled closer together, improving space usage and improving aesthetics. Furthermore, individual modules can be added to and connected with existing solar panels. In addition, the use of an integrated mounting rail allows the panel to be mounted closer to the roof improving aesthetics. Further, a minimal number of parts are utilized for the entire assembly. Finally, solar modules can be securely stacked and shipped with pre-installed mounting brackets, reducing shipping, packing and unpacking costs.

DETAILED DESCRIPTION OF THE DRAWINGS

The present invention relates generally to solar panels and more particularly to a mounting system for solar panels. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for an integrated module frame and racking system for a solar panel. The solar panel in accordance with the present invention is optimized for fast installation on a structure with a particular emphasis on completing all installation activities from the top of the module (without wiring, grounding and attachments from below). This optimization includes all steps in assembling and installing the solar panel. Furthermore utilizing the integrated frame and racking system multiple modules for the panel can be supported during transport. In addition by utilizing the integrated system in accordance with the present invention individual modules can be added to and connected with existing solar panels and can be mounted in a more aesthetically pleasing way. Finally, a minimal number of parts are utilized for the entire assembly.

To describe the features of the present invention in more detail, refer now to the following description in conjunction with the accompanying drawings.

Figure 2:
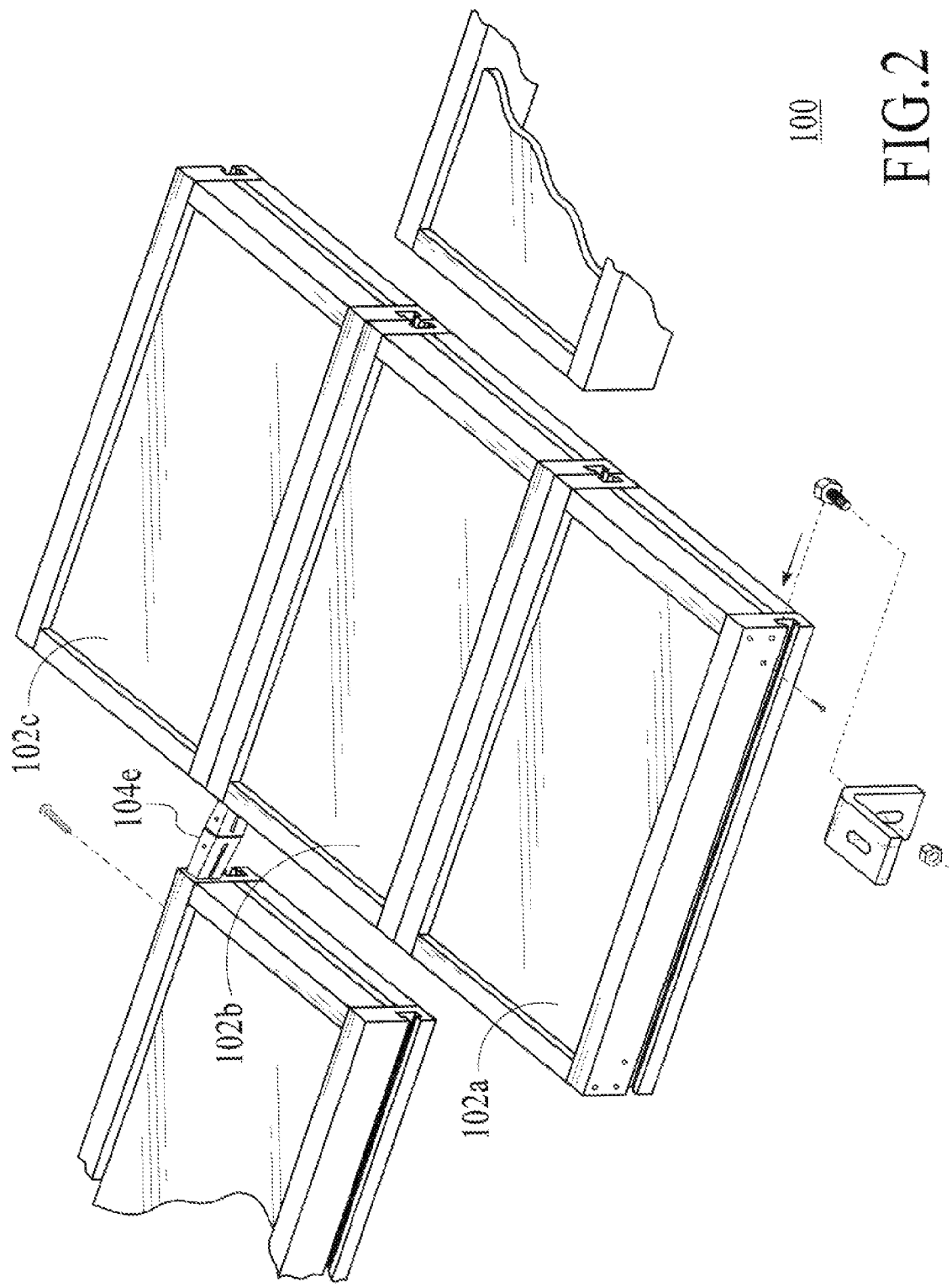
FIG. 2 illustrates a perspective view of a mounting system for a solar panel in accordance with the present invention.

FIG. 2 illustrates a perspective view of a mounting system for a solar panel 100 in accordance with the present invention. As is seen, there are three modules 102A-102C shown that are coupled together that include several features that allow for a modularized and integrated system for the solar panel 100. Firstly, there is a splice that mechanically connects one module to another and provides the electrical grounding connection between the solar modules. The mechanical strength of the splice and attachment technique to the module frame allows each module frame to function in the same rigid way as the underlying frame rail in a conventional solar panel assembly. In addition, there are cable connector grooves between modules that minimize the amount of wiring activities that are required for connecting the modules together. Finally, the system includes only requiring one electrical grounding connection to the entire panel; module to module and module to rail grounding connections are not needed. To describe the feature of the invention in more detail refer now to the following description in conjunction with the accompanying figures.

Figure 1:
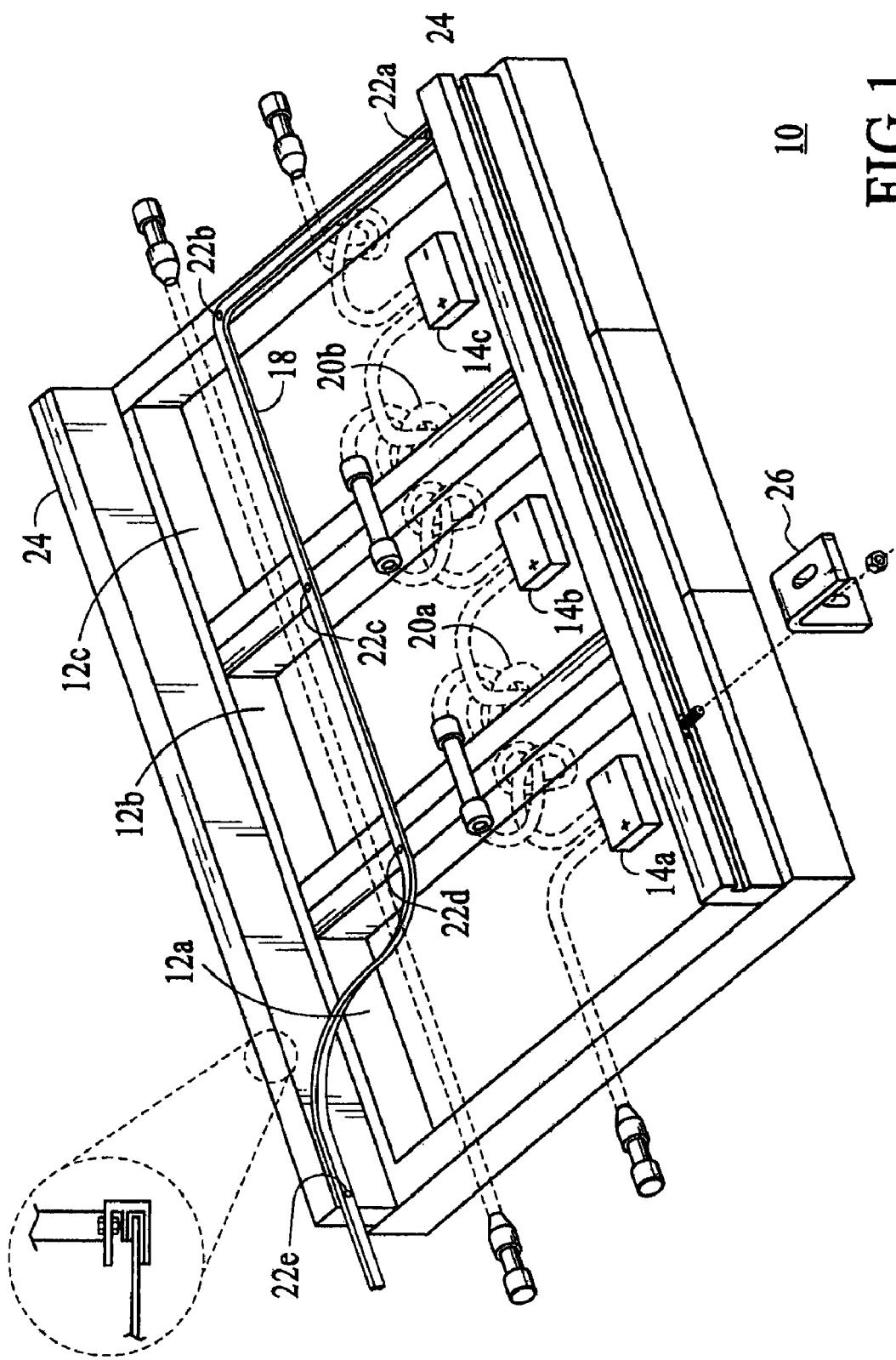
FIG. 1 illustrates a conventional solar panel assembly.
Figure 1A:
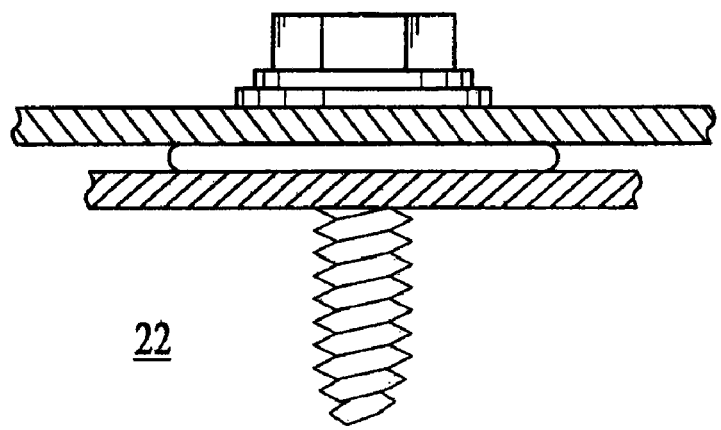
FIG. 1A is a view of a grounding screw for the solar panel.
Figure 1B:
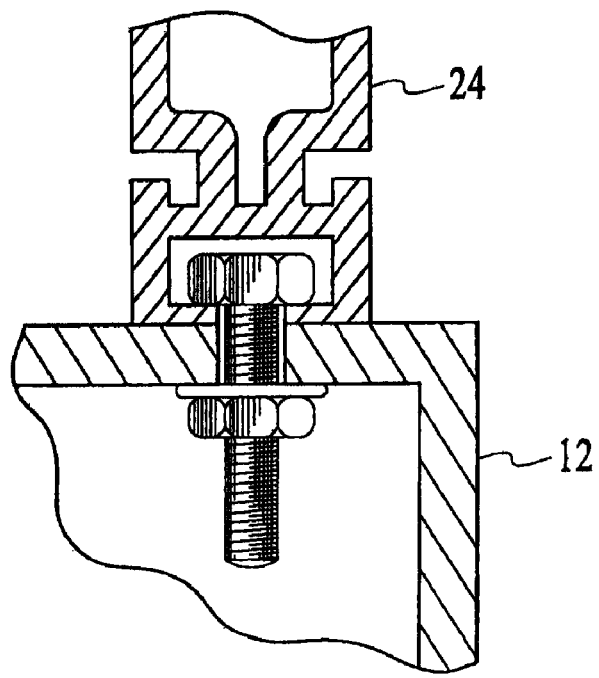
FIG. 1B is a view of a module attached to a rail.
Figure 2A:
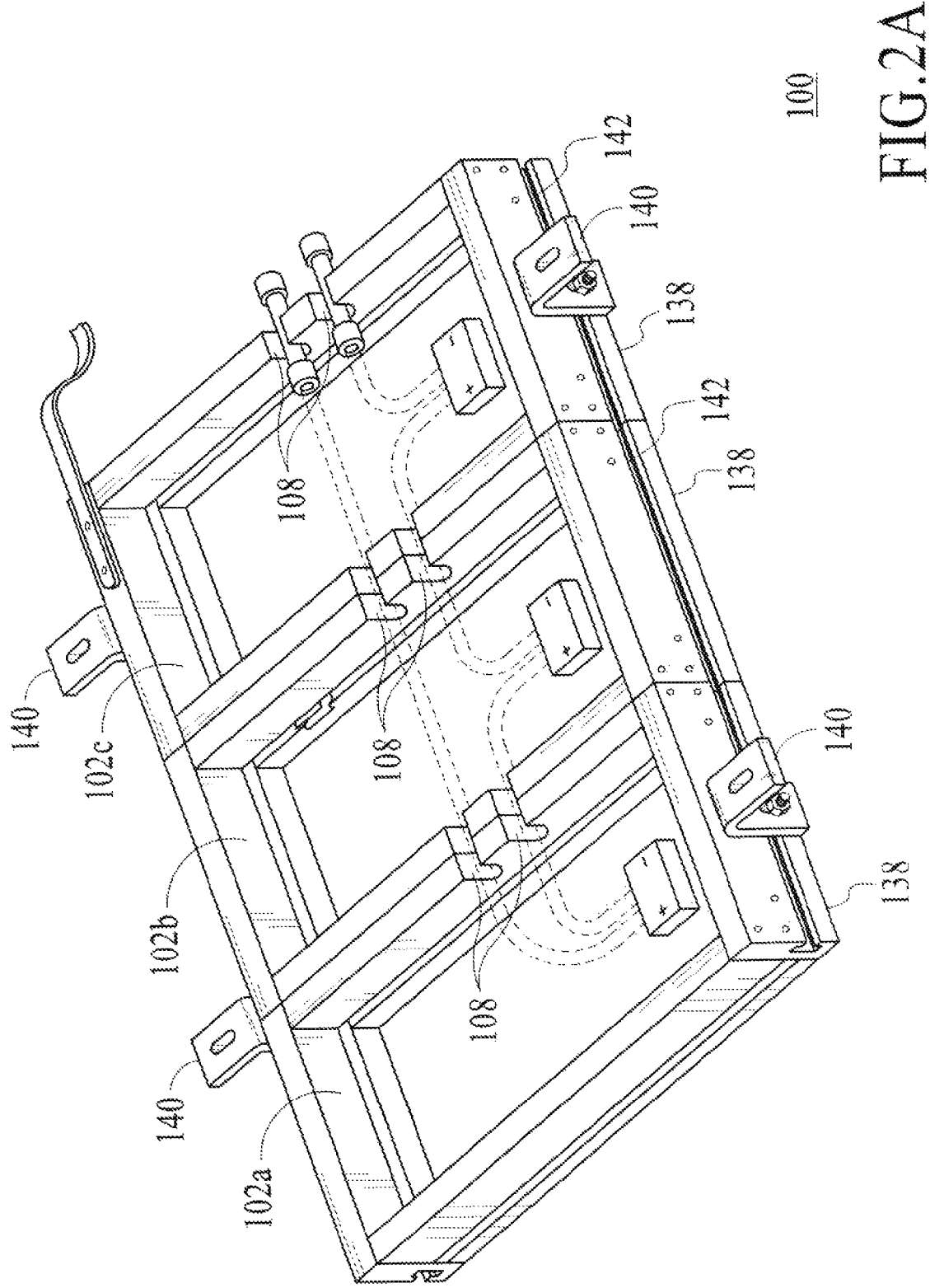
FIG. 2A is a diagram of a back view of the solar panel in accordance with the present invention.
Figure 2B:
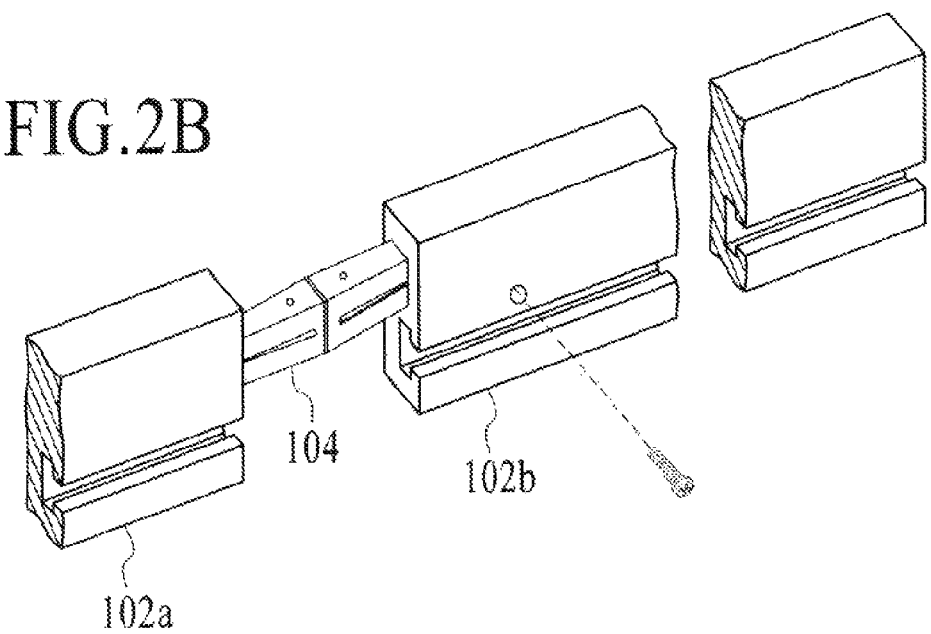
FIG. 2B shows an east-west splice that allows connection of a module or panel to the side (typically east or west) of an existing module.

FIG. 2A is a diagram of a back view of the solar panel 100 in accordance with the present invention. As has been above-mentioned the solar panel 100 includes a plurality of modules 102A-102C. However, one of ordinary skill in the art readily recognizes that the panel 100 could include any number of modules in both the X and Y directions and could be in any configuration and its use would be within the spirit and scope of the present invention. The solar panel 100 requires significantly fewer parts to assemble and is more easily constructed than the conventional solar panel 10 of FIG. 1. Referring now to FIG. 2B, as is seen there is an east-west (e-w) splice 104 shown internal to two modules 102A and 102B that connect the modules 102A and 102B. The splice 104 provides several useful features for the panel 100, including mechanical rigidity between modules, a grounding path between modules, an alignment method between modules, a securing method between modules and a compression method between modules.

Figure 2C:
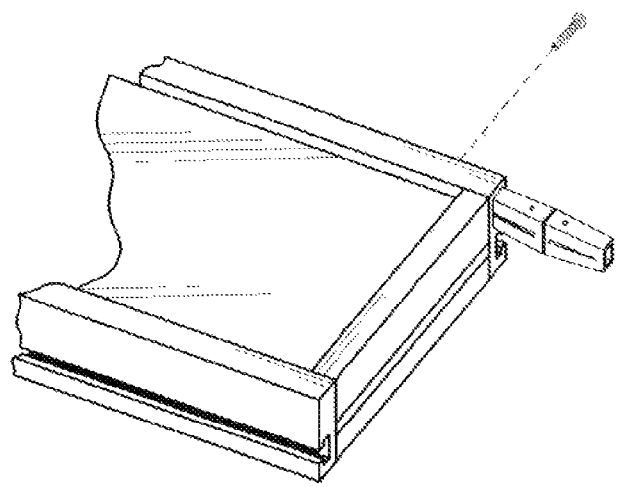
FIG. 2C shows a north-south splice that allows connection of a module or panel above or below (typically north or south) of an existing module.

Also north-south splices between rows can be effectively utilized. FIG. 2C shows a north-south splice 104E that allows connection of a module or panel above (typically, north) or below an existing module. This splice 104E provides alignment between rows, rigidity between rows and provides a grounding connection. Use of this north-south splice 104E reduces mounting points on the mounting surface.

In a preferred embodiment, the splice is a rigid removable connecting piece that protrudes from the side or top of the module when inserted in one module. Additionally, the splice is generally hidden when installed, by virtue of mounting inside the module frame hollow section or side groove. The splice allows for a very close fit between modules, thereby improving space utilization. Also, the splice has conductive capability (including the non-conductive main part with conductive wires or surface). The splice has a slightly arched profile to counteract module sag after installation (similar to the arch on a bridge). It should also be understood that although the splice in this embodiment is internal to the solar modules, one of ordinary skill in the art readily recognizes that the splice could be external and its use could be within the spirit and scope of the present invention.

Figure 3:
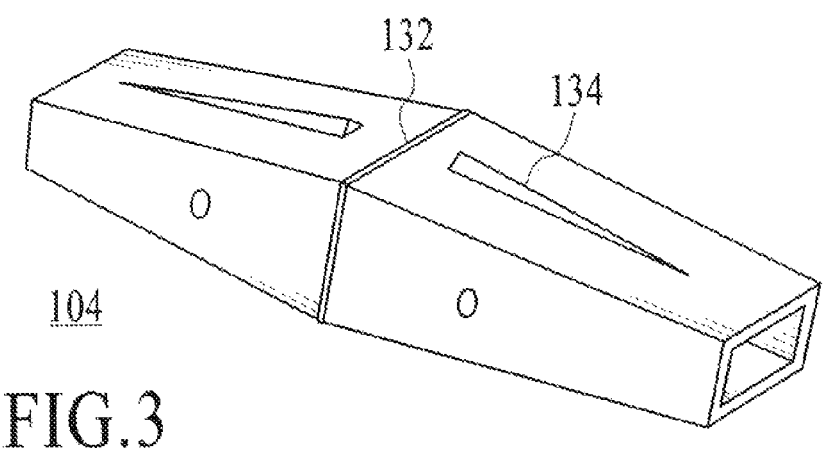
FIG. 3 illustrates a splice in accordance with the present invention.

FIG. 3 illustrates a splice 104 in accordance with the present invention. The splice 104 is tapered to allow for easy initial assembly line up and a final tight fit between the modules 102A and 102B. In a preferred embodiment it is precisely located in the panel 100 in a centerline fashion. In a preferred embodiment the splice 104 is a tapered conductive metal to provide a grounding path between modules, and includes a sharp edge to improve grounding to each module. The splice 104 is also grooved for easy screw insertion from the top or the side of the module 102. The splice 104 precisely aligns the modules 102 and allows the assembler to compress the connector sockets 108, thereby completing an electrical connection between the two adjacent modules. The electrical connection between the two adjacent modules by the splice 104 eliminates the need to run a grounding wire between each module. As is seen only one other grounding wire is required for an entire panel assembly as long as all solar modules are connected with a splice. The splice provides sufficient rigidity between modules so that the entire panel can be transported and lifted to a roof, or installed directly on a roof or other surface in a secure and long lasting fashion.

In a preferred embodiment, each splice would utilize a screw for attachment to secure the two modules together. Other mechanisms for securing the two modules together include but are not limited to a cam type compression device, a press fit or toothed barb device, a spring clip attachment, a through pin and an expandable section at each end. For a three module solar panel, as illustrated in exploded view, a total of four splices and eight self-threading screws are utilized to provide the solar panel. Accordingly, a minimal number of parts are required for the assembly of the panel. The splice also includes a plurality of raised features, which couple the modules together. The first raised feature 132 acts as a stop for the splice. The second raised feature 134 acts as a grounding path for the splice.

Referring back to FIG. 2, a plurality of connector sockets 108 are provided in each of the modules 102. These connector sockets 108 provide the following advantages:

The connector sockets 108 can be labeled (+/−) and then sized to only accept the proper cable connection, thereby minimizing wiring problems. The connector sockets 108 are located on the modules (on the left/right or E-W sides, and/or on the top/bottom or N/S sides) to prevent improper wiring based on cable lengths and connector socket size/configuration. The connector sockets 108 are on frame sides to allow for easy and reliable module interconnection. The connector sockets 108 on frame sides allow for pre-installed home run return wire paths. The connector sockets 108 on frame sides allow for interconnection of strings. The connector sockets 108 on frame sides allow for concealed wire connections after modules are mounted. Finally, the overall design improves wire management and grounding.

Optimally a cable holder 136 can be used in this solar panel. Referring back to FIG. 2A, a cable, holder 136 is coupled to a side portion of a module to hold cables that may be stored in the panel. Typically the cable holder 136 is a cable clip that holds the stored cable in place.

Figure 4:
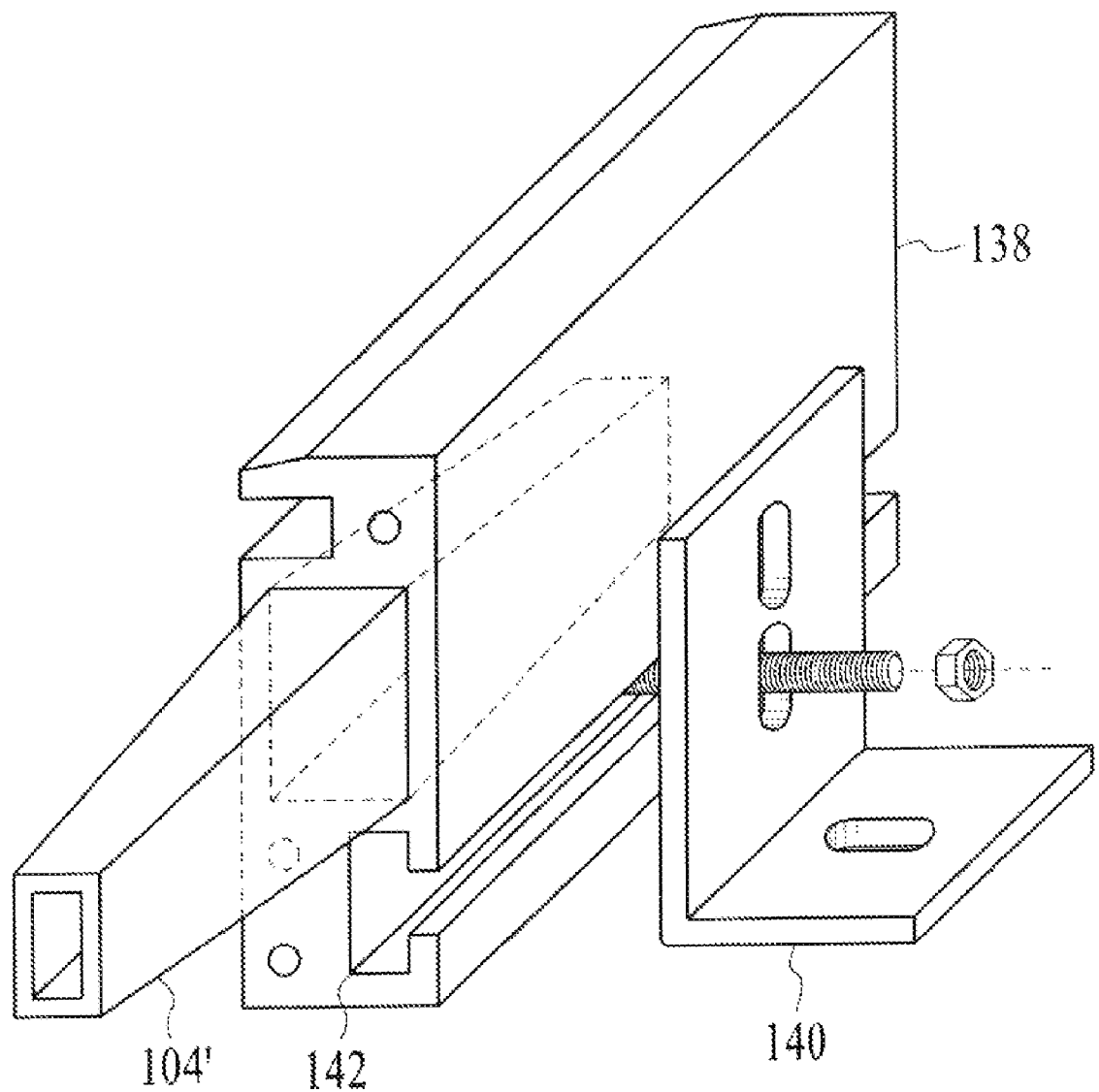
FIG. 4 illustrates a groove on the module panel and a surface mounting bracket for securing the module panel to the roof.

FIG. 4 illustrates a groove 142 on the metal plate 138 of the module. The groove allows for securing the panel (composed of one or more modules) to a structure such as a roof, with the mounting bracket. The grooves 142 on the sides of each of the metal plate are aligned when the modules are connected with splices, thereby creating a continuous groove along the entire panel to allow for the connection of the solar panel to a roof or the like. In so doing the solar panel can be rigidly mounted on a structure in a single plane. The continuous groove allows attachment to an available secure point (typically a rafter) at any horizontal location. Typically the grooved portion will comprise an extrusion on a metal plate 138 shown in FIG. 4 that is part of the module thereby creating a full and roughly continuous extension in the panel. This groove 142 can be installed on both the sides (east-west) and top/bottom (north-south) of the modules, allowing the module to be installed in a variety of different orientations.

The mounting bracket 140 attaches securely to the roof and then attaches to the grooved metal plate 138 with a bolt. This bracket 140 may include provisions to mount, the panel at a variable height to account for variations in surfaces. Alternatively, this bracket 140 may be mounted to the roof with a threaded bolt or other variable height mounting point. The solar panels can be mounted on a horizontal, vertical or sloped structure or surface utilizing the mounting bracket.

Figure 5:
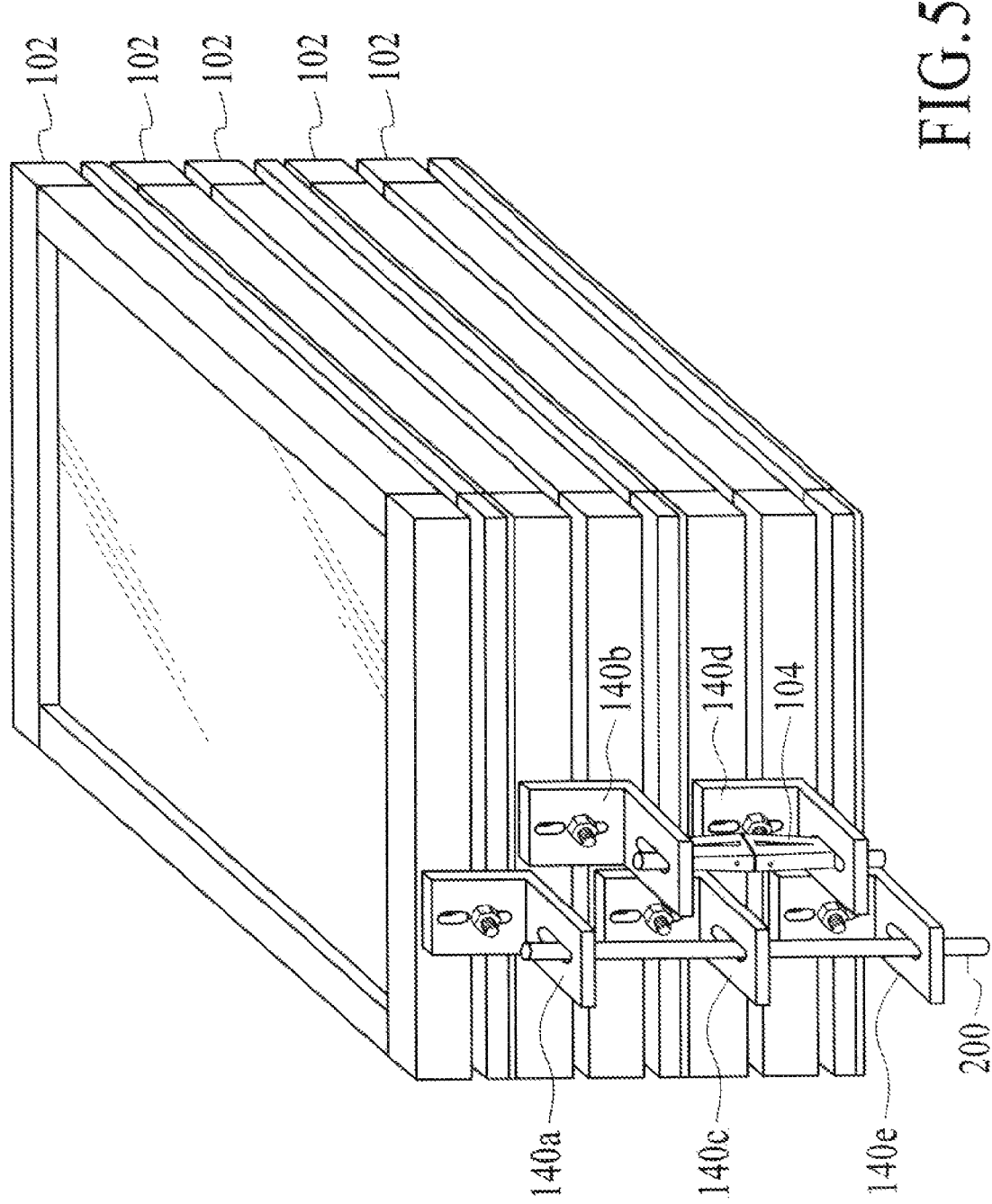
FIG. 5 illustrates a shipping stack of solar modules with pre-installed mounting brackets, through attachment rod and splice storage.

Finally, solar modules can be securely stacked and shipped with pre-installed mounting brackets, reducing shipping, packing and unpacking costs. FIG. 5 illustrates a shipping stack of solar modules with pre-installed mounting brackets, through attachment road and splice storage.

FIG. 5 illustrates how multiple modules are securely stacked for shipment on a single palette. Mounting brackets 140A-140E are pre-installed on sides of modules 104 thereby reducing field-installation labor. Not that, depending on rafter location, these brackets 140A-140B are easily loosened and moved during installation. A metal rod 200 is installed in holes in the mounting brackets 140A-140B, thereby preventing module shifting during shipment.

In this illustration, mounting brackets are offset so that every-other bracket is aligned, although using a different bracket configuration all the brackets can be in one vertical plane or installed at different locations on the module frame. Splices are slid over the metal rod for storage during shipping. In this embodiment, a stack of 16 modules would have 32 mounting brackets pre-installed on module frames, and 32 splices stored on four metal securing rods.

SUMMARY

An integrated module frame and racking system for a solar panel is disclosed. The solar panel comprises a plurality of solar modules and a plurality of internal splices for coupling the plurality of solar modules together. The plurality of internal splices provide a way to make the connected modules mechanically rigid both during transport to the roof and after mounting for the lifetime of the system, provide wiring connections between modules, provide an electrical grounding path for the modules, provide a way to add modules to the panel, and provide a way to remove or change a defective module. Connector sockets are provided on the sides of the modules to simplify the electrical assembly of modules when the modules are connected together with splices.

A solar panel in accordance with the present invention is optimized for fast and reliable installation. In addition, the fewer parts and simpler assembly technique reduces the potential for installation error. In addition, multiple modules for the panel can be supported during transport. In addition, modules and panels can be assembled closer together, improving space usage and improving aesthetics. Furthermore, individual modules can be added to and connected with existing solar panels. In addition, the use of an integrated mounting rail allows the panel to be mounted closer to the roof, improving aesthetics. Finally, a minimal number of parts are utilized for the entire assembly.

Although the present invention has been described in accordance with the embodiments shown, one of ordinary skill in the art will readily recognize that there could be variations to the embodiments and those variations would be within the spirit and scope of the present invention. For example, although the splice is preferably made of a conductive material such as aluminum, it could be made utilizing a non-conductive material which has a conductive capability added to its surface and its use would be within the spirit and scope of the present invention. Accordingly, many modifications may be made by one of ordinary skill in the art without departing from the spirit and scope of the appended claims.

What is claimed is:

1. A solar panel comprising:
   a plurality of solar modules, each of the solar modules having frames that includes a plurality of connector sockets placed such that improper wiring based on cable length is prevented and placed such that at least one connector socket of one solar module is aligned with the connector socket of another solar module when coupled together; and a plurality of splices that insert into the frames of the solar modules for coupling the plurality of solar modules together; wherein the plurality of splices provides rigidity, wherein each of the plurality of splices provides a grounding path and a stop for the modules, each of the plurality of splices comprising:

a body for coupling two solar modules together; a coupling mechanism on the body for causing a press-fit coupling of two solar modules; and a secure mechanism for securing the body to at least one of the two solar modules.

2. The solar panel of claim 1 wherein the coupling mechanism comprises one or more raised features on the body.

3. The solar panel of claim 1 wherein the secure mechanism comprises one or more screws.

4. The solar panel of claim 1 wherein each of the modules include a groove extending along the solar module; the groove for receiving a bracket, the bracket for securing the solar panel to a structure.

5. The solar panel of claim 1 wherein each of the solar modules is a solar thermal module.

6. The solar panel of claim 1 wherein the splice is internal to the solar modules.

7. The solar panel of claim 1 wherein each of the splices includes a first raised feature providing a stop for the splice and a second raised feature for providing a grounding path for one or more of the splices.

8. The solar panel of claim 1 wherein the body is tapered.

9. The solar panel of claim 1 wherein mounting brackets are pre-installed on each of the modules and used to securely stack modules and other installation components for shipment.

10. A solar panel comprising:

a plurality of solar modules, each of the solar modules having a frame with plurality of connector sockets located in the frame such that improper wiring based on cable length is prevented, having a shape that fits a cable and placed such that at least one connector socket of one solar module is aligned with the connector socket of another solar module when coupled together; wherein each of the modules include a groove extending along the solar module; the groove for receiving a bracket, the bracket for securing the solar panel to a structure; and a plurality of splices for inserting into the fame and coupling the plurality of solar modules together; wherein the plurality of splices provides rigidity, wherein each of the plurality of splices includes;

a first raised feature for providing a stop on one of the plurality of splices and second raised feature for providing a grounding path for one or more of the solar modules, each of the plurality of splices comprising:

a body for coupling two solar modules together;

a coupling mechanism on the body for causing a press-fit coupling of two solar modules; and a secure mechanism for securing the body to at least one of the two solar modules, wherein the body is tapered.

11. The solar panel of claim 10 wherein each of the solar modules is a solar thermal module.

12. The solar panel of claim 10 wherein the splice is internal to the solar modules.

13. A solar panel comprising;

a plurality of solar modules, each of the solar modules having a frame with a plurality of connector sockets located in the frame such that improper wiring based on cable length is prevented by the shape of the connector socket, each connector socket having a shape that fits a cable and wherein each of the connector sockets are placed such that at least one connector socket of one solar module is-aligned with the connector socket of another solar module when coupled together; wherein each of the modules include a groove extending along the solar module; the groove for receiving a bracket, the bracket for securing the solar panel to a structure; wherein a continuous groove is provided when the plurality of solar modules are coupled together; and a plurality of splices for coupling the plurality of solar modules together; wherein each of the solar module includes a plurality of apertures, at least one of the plurality of apertures capable of receiving one of the plurality of splices, wherein the solar module is rigidly coupled to another module when a splice is coupled therebetween wherein each of the plurality of splices provides a grounding path and a stop for the modules, each of the plurality of splices comprising:

a body for coupling two solar modules together;

a coupling mechanism on the body for causing a press-fit coupling of two solar modules; and a secure mechanism for securing the body to at least one of the two solar modules; wherein the coupling mechanism comprises one or more raised features on the body.

14. The solar panel of claim 13 wherein the secure mechanism is selected from a group consisting of one or more screws and an expandable section on the splice.

* * * * *